United States Patent [19]
Richardson

[11] Patent Number: 5,180,268
[45] Date of Patent: Jan. 19, 1993

[54] EXPANSION WASHER

[76] Inventor: Arthur B. Richardson, One Greenwood Way, Mill Valley, Calif. 94941

[21] Appl. No.: 897,918

[22] Filed: Jun. 12, 1992

[51] Int. Cl.[5] .............................................. F16B 43/00
[52] U.S. Cl. .................................. 411/536; 411/350; 411/371; 411/149
[58] Field of Search ............... 411/371, 350, 147, 149, 411/150, 531, 132, 160, 162, 535, 536, 537, 538, 546

[56] References Cited

U.S. PATENT DOCUMENTS

| | | | |
|---|---|---|---|
| 487,721 | 12/1892 | Kalb | 411/533 X |
| 1,386,317 | 8/1921 | Claassen | 411/535 X |
| 1,423,480 | 7/1922 | Gumber et al. | 411/350 |
| 2,405,889 | 8/1946 | Kennedy | 411/546 |
| 3,830,484 | 8/1974 | Bright et al. | 411/535 X |
| 5,090,855 | 2/1992 | Terry | 411/149 X |

FOREIGN PATENT DOCUMENTS 322361  7/1957  Switzerland ..................... 411/535

Primary Examiner—Rodney M. Lindsey
Attorney, Agent, or Firm—Owen, Wickersham & Erickson

[57] ABSTRACT

An expansion washer structure comprises first and second washer elements having projected ramp members which engage. The ramp members have sloped ramp and level segments adjacent to one another which are disposed to progressively engage as the washer elements are rotated with respect to each other. An internal spring is connected between the washer elements to urge them in one rotational direction when normal compressive force on the washer elements is released. When the washer elements are rotated relative to each other, their ramp members move progressively to different positions, causing the washer structure to increase in thickness.

9 Claims, 3 Drawing Sheets

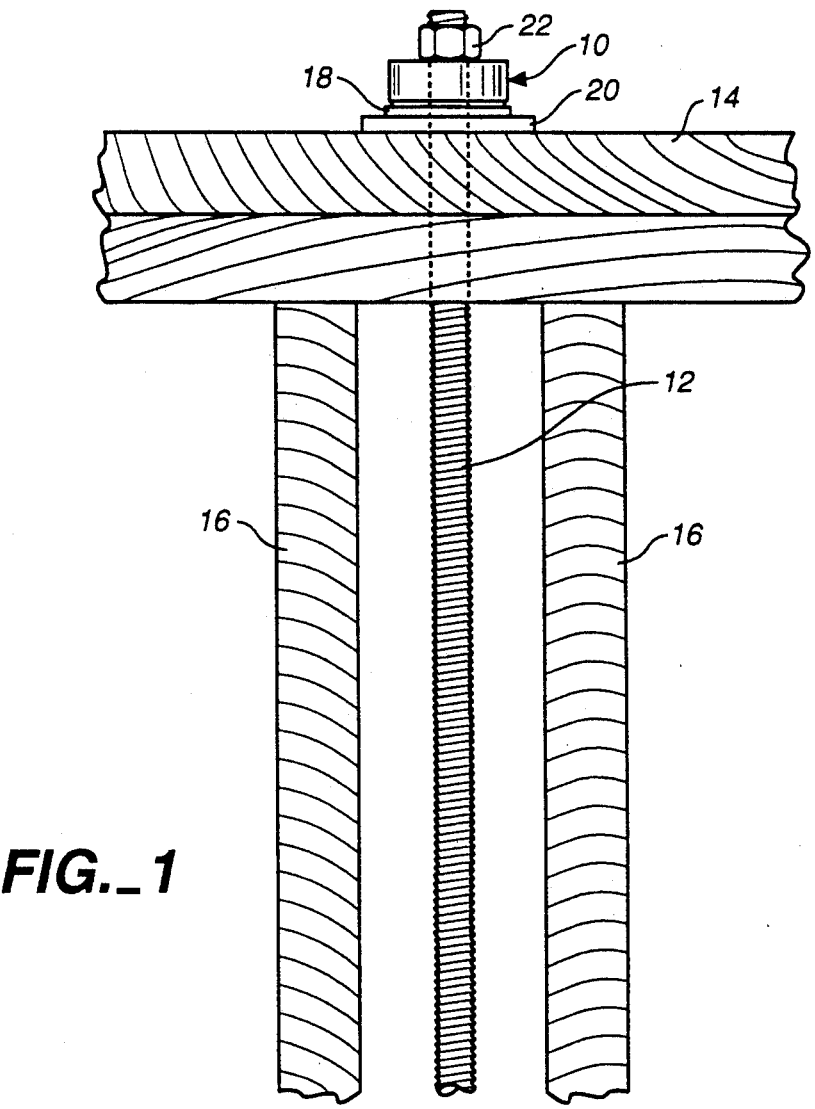
FIG._1
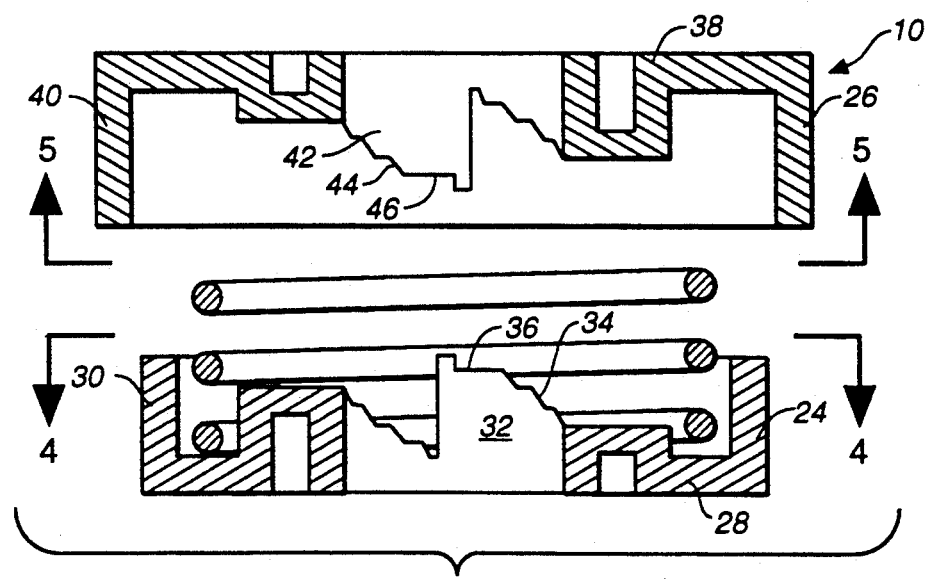
FIG._3

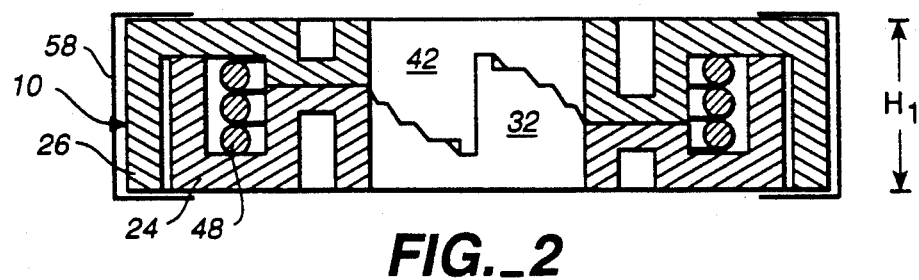
FIG._2
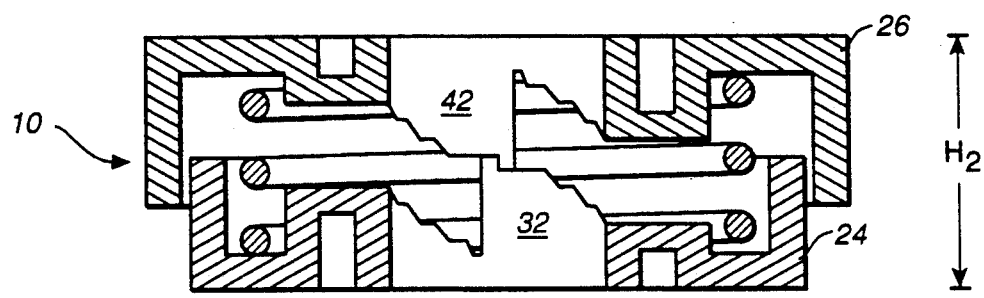
FIG._6
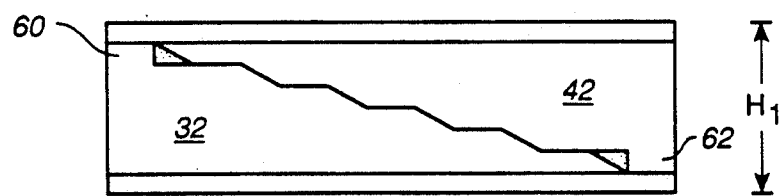
FIG._7
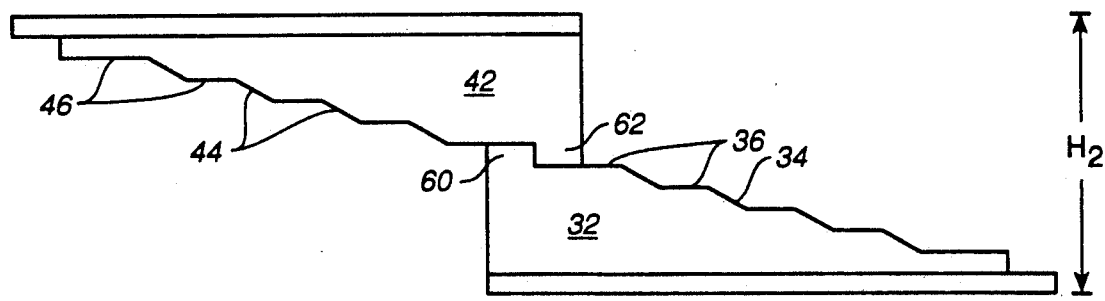
FIG._8

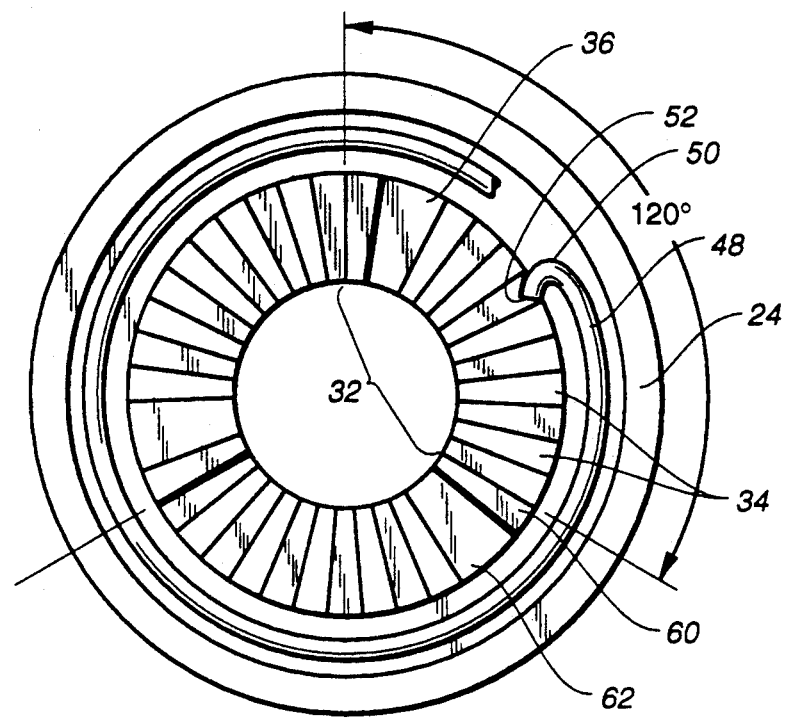
FIG._4
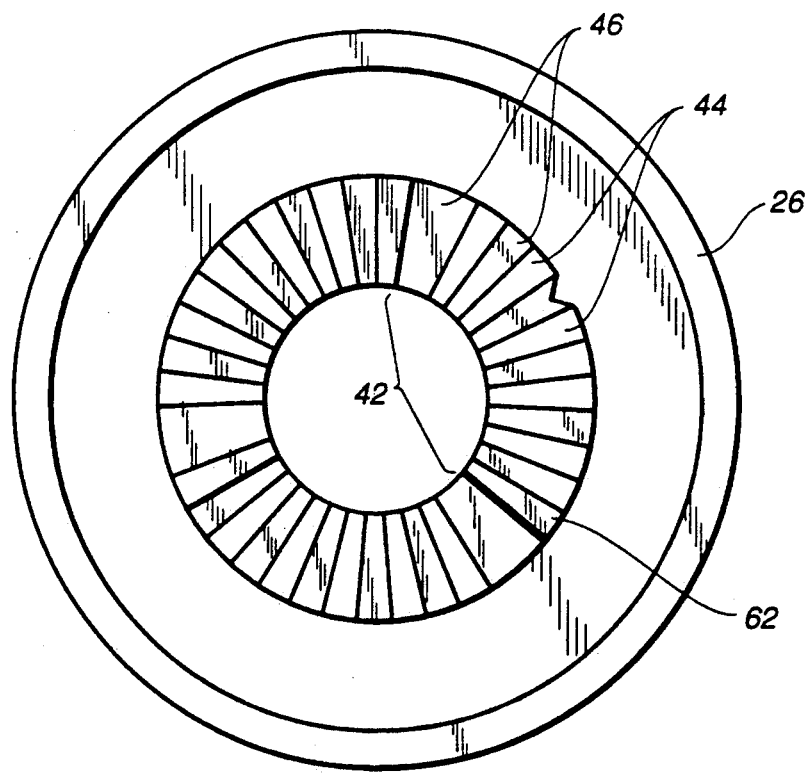
FIG._5

EXPANSION WASHER

This invention relates to retaining devices for structural tie-down systems and more particularly it relates to an expansion washer which maintains a snug assembly of wooden structural members despite shrinkage of such members in the assembly.

BACKGROUND OF THE INVENTION

In certain wooden building structures, tie-down systems are utilized to provide increased strength and stability, particularly to counteract severe wind and earthquake loads. Examples of such systems are shown in U.S. Pat. Nos. 4,875,314 and 4,321,776. In order for such tie-down systems to function with maximum effectiveness, the tie rod connections must be kept snug and tight, so that there is no excess "play" or looseness. Wooden members have a natural tendency to shrink with age. Therefore, although a tie-rod hold down system may be tight and snug when installed, wood shrinkage may cause tie rod connections to loosen with the passage of time. It is impractical and expensive to provide access to all conventional fasteners of a tie-rod system so that they can be manually tightened at selected time intervals. Therefore, it is essential to counteract the looseness in such connections that tends to develop and to provide some means for automatically maintaining the snugness of tie-rod connections in a structural tie-down system during the life of the building for which the system is used. The present invention solves this problem.

SUMMARY OF THE INVENTION

In accordance with the principles of the invention an expansion washer is provided for use in tie-down system connections which functions to expand or grow in thickness to counteract any looseness in the aforesaid connections which tends to occur over a period of time. The expansion washer is comprised of a lower circular cup-like element having an outer wall which slidably fits within the outer wall of an upper cup-like element. Extending from a base surface within each of the elements are a plurality of arcuate ramp members each having a series of defined steps. A spring having one of its opposite ends secured to the upper ramp member and its other end secured to the lower ramp member is coiled around the ramp members and constantly exerts a force tending to push the two cup-like elements and their ramp members in opposite directions. When the expansion washer is installed, the two cup-like elements are nested with their ramp members fully meshed so that washer has a minimum thickness. At this point, the coiled spring is compressed so as to have its maximum potential force, and a temporary retaining means such as a clip is used to hold the elements together. In this compacted condition the expansion washer is installed around a tie-rod or bolt, and the clip means is later removed when the washer is held in position by a hex nut on the bolt which is tightened in place. When some clearance between the hex nut and washer commences to occur due to shrinkage of wooden members being held by the tie-rod, the spring acts to rotate the lower cup-like element within the upper cup-like element. As this occurs, the ramp member of the lower element is driven up the ramp member of the upper element causing the two cup-like elements to move farther apart. Thus, the expansion washer automatically increases in thickness to eliminate the clearance and thereby maintain a snug connection with the attached hex nut.

When used in large numbers in a building tie-down system, the expansion washer operates to assure continued tightness and rigidity of the connected system members so that under severe windstorm or earthquake load conditions, structural integrity will be maintained.

Other objects, advantages and features of the invention will become apparent from the following detailed description of one embodiment thereof, presented in conjunction with the accompanying drawing.

BRIEF DESCRIPTION OF THE DRAWING

FIG. 1 is a fragmentary view in elevation showing one portion of a building tie-down system utilizing an expansion washer embodying principles of the present invention.

FIG. 2 is a view in elevation and in section of an expansion washer according to the present invention in its compacted state ready for installation.

FIG. 3 is an exploded view in elevation and in section showing the expansion washer of FIG. 2.

FIG. 4 is a plan view of the lower washer element taken along line 4—4 of FIG. 3.

FIG. 5 is a plan view of the upper washer element taken along line 5—5 of FIG. 3.

FIG. 6 is a view in elevation and in section showing the washer of FIG. 2 in its fully expanded state.

FIG. 7 is a diagrammatic view in elevation showing the ramp members of an expansion washer in their fully compressed position.

FIG. 8 is a diagrammatic view in elevation showing ramp members of an expansion washer in their fully expanded position.

DETAILED DESCRIPTION OF EMBODIMENT

With reference to the drawing, FIG. 1 shows an expansion washer 10 embodying principles of the present invention as it appears when used typically in a building tie-down system. In such a system for bracing shear walls of wooden buildings, a series of tie-rods (shown typically as tie-rod 12) extend through wooden cross beams 14 between studs 16 and are anchored into the floor below or to the building foundation (not shown). In the typical installation shown, the expansion washer 10 rests on a bearing plate 20 next to the wood surface. A standard hex nut 22 is threaded to the tie-rod 12 against the expansion washer on its upper side. Since a significant amount of floor framing shrinkage occurs after the building is erected and the wall coverings are in place, the tie-rod or bolted assembly will normally become quite loose over a period of time. If this looseness is not eliminated, the bracing elements of the tie-down system are allowed to move differentially with respect to each other. This can cause damage to wall finishes and large glass areas due to movement of the building structure during earthquakes or severe windstorms. In accordance with the present invention, the expansion washer 10 functions to increase automatically in thickness to maintain snug connections for all of the system tie-rods, thereby increasing the overall structural integrity of the building and minimizing earthquake damage.

As shown in FIGS. 2-5, the expansion washer 10 is comprised of a lower cup-like element 24 which fits slidably within an upper cup-like element 26. The element 24 has an annular planar base 28 surrounded by an outer wall 30 of uniform thickness. Around the inner edge of the annular base and extending above it is an annular projecting ramp member 32 of uniform radial thickness and having an irregular upper surface comprised of a series of sloped ramp segments 34 separated by level steps 36.

The upper cup-like element 26 also has an annular base 38 with an outer wall 40 extending downwardly from its outer edge which is concentric with and adjacent to the outer wall 30 of the lower cup-like element 24. Preferably, the clearance between the element walls 30 and 40 is around 0.005 inches so that the two cup-like elements will readily rotate relative to each other.

Extending downwardly from the inner edge of the annular base 36 is a projecting ramp member 42 similar to the projecting ramp member 32 for the lower element and having a similar series of ramp segments 44 and level steps 46.

As shown in FIGS. 4 and 5, the ramp segments and steps for both projecting members 32 and 42 extend radially and are preferably arranged in three similar groups forming a complete circle in the embodiment illustration. When the expansion washer 10 is in its narrowest configuration the ramp segments and steps of the ramp members 32 and 42 for upper and lower cup-like members are meshed together with essentially no clearance between them. As shown in FIGS. 2 and 7, the washer 10 at this stage has a height $H_1$. Now, when the upper and lower cup-like members commence to rotate in opposite directions, the leading edges of the flat steps 36 and 46 engage and move up the adjacent ramp segments 34 and 44 until the next series of flat steps are reached. Thus, as the upper and lower ramp members rotate, their steps move up one adjacent ramp segment after another. As this rotation takes place, the upper and lower cup-like members 24 and 26 move progressively farther apart along their central longitudinal axis.

To provide the driving force for causing the relative Torsional movement between the two cup-like elements, a coiled spring 48 is used. As shown in FIGS. 4 and 5, one hooked end 50 of the spring 48 is seated within a notch 52 on the outer surface of the lower projecting ramp member 32, and at its opposite end, another hook portion 54 of the spring 48 is seated within a notch 56 provided in the outer surface of the upper projecting ramp member 42. When the two cup-like elements 24 and 26 are together in their minimum thickness configuration, as shown in FIG. 2, the spring is compressed so as to have its maximum potential force. In this configuration, the expansion washer 10 is held together temporarily by a pair of retaining clips 58, which are spaced 180° apart and can be removed after the washer is installed and is permanently held in place by a hex nut or some other suitable fastener.

As described, it is preferred that the annular projecting ramp members 32 and 42 for the washer elements 24 and 26 each have three groups or sectors of alternating ramp segments and steps. Each group or sector covers 120° of a circle in plan view. Each radially extending ramp segment slopes upward from a horizontal plane at an angle of around 28° at its outer edge and around 46° at its inner edge.

In the embodiment described, as shown diagrammatically in FIGS. 7 and 8, each of the three groups of ramp segments and steps forming a projecting ramp member is comprised of five ramp segments 32, 42 and six steps 36, 46. Each ramp provides a movement apart of the two cup-like elements of 0.075 inches, so that the total expansion range for this typical expansion washer (from $H_1$ to $H_2$) is 0.375 inches.

At the upper end of each quadrant of the lower ramp member 32 is a stop member 60, and similarly at the outer end of each quadrant for the upper ramp member is a stop member 62. As shown in FIG. 8, when the expansion washer is moved to its maximum expansion position, the two stop members 60 and 62 for each quadrant engage and stop further rotation.

For maximum efficiency and reliability, the expanded washer 10 should be made to fairly close tolerances. It has been found that mass production with good tolerance levels can be accomplished using well-known powder metallurgy technology. Using such techniques the ramp members with their ramp segments and steps can be formed with adequate hardness and surface finish to precise dimensions so that the washer 10 will function automatically to fulfill its purpose.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A structure comprising:
a first washer element having a hole therein along a first central axis and a first axis guide means, said first washer element having a first side including a first projecting ramp member,
a second washer element disposed adjacent to said first washer element wherein a third side of said second washer element faces said first side of said first washer element, said second washer element having a hole therein along a second central axis disposed generally coincident with said first central axis of said first washer element, said second washer element having a second axis guide means which when engaged with said first axis guide means permits relative motion between said first and said second washer element only around said coincident first and second central axes, and said third side of said second washer element having a second projecting ramp member disposed to contact said first projecting ramp member, wherein said second projecting ramp member includes at least one sloped ramp segment and at least one level step segment adjacent to one another and disposed to progressively engage said first projecting ramp member when said first washer element is rotated with respect to said second washer element; and
spring means connected between said first washer element and said second washer element.

2. A structure as in claim 1, wherein said first projecting ramp member includes at least one sloped ramp segment and at least one level step segment adjacent to one another and disposed to progressively engage said second projecting ramp member when said first washer element is rotated with respect to said second washer element.

3. A structure as in claim 2, wherein said first washer element and said second washer element includes a matched plurality of respectively first and second projecting ramp members.

4. A structure as in claim 1, wherein said first axis guide means includes a first raised flange disposed generally perpendicular to said first side of said first washer element along an arc at a first radial distance from said first central axis and wherein said second axis guide means includes a second raised flange disposed generally perpendicular to said third side of said second washer element along an arc at a second radial distance from said second central axis, such that when said washer elements are disposed adjacent to one another, an outer flange of said first and second raised flanges is adjacent to and outside of an inner flange of said first and second raised flanges thereby permitting only circular motion between said first and said second washer elements.

5. A structure as in claim 1, wherein said first projecting ramp member and said second projecting ramp member each have a matched plurality of alternating sloped ramp segments and level step segments providing a progressively changing distance between said first and second washer element as the first and second ramp elements are rotated against one another.

6. A structure as in claim 5, wherein said first and second ramp members include a set of end stop projections at each end of said matched plurality of alternating sloped ramp segments and level step segments, said stop projection being adjacent to a level step segment at each end, such that when the end of the rotational travel is reached in either direction, said end projections prevent further rotation without disengagement of the end projections from one another.

7. A structure as in claim 1 wherein said spring means provides a force urging the rotation of said first washer element relative to said second washer element.

8. A structure as in claim 7, wherein said spring means is generally disposed between said first and second washer elements.

9. An expansion washer adapted to automatically increase in thickness in order to maintain a snug connection for a tie-rod retainer, said washer comprising
   a first cup-like element having an annular base and a peripheral wall around the outer edge of said base;
   a second cup-like element having an annular base with a peripheral wall around its outer edge which has a slightly larger diameter than the peripheral wall of said first cup-like element, so that said first element slidably fits within said second element;
   a first integral ramp member extending from said annular base on said first element and a second integral ramp member extending from said annular base of said second element,
   said first and second ramp members each having alternate sloping ramp segments and horizontal step portions, said ramp members being meshed together with their ramp segments and step portions in contact when said washer is at its minimum thickness; and
   spring means for constantly urging said cup-like members to rotate apart when no compressive force is being applied to said cup-like members,
   whereby the ramp members are caused to rotate in opposite directions by said spring means so that only certain step portions are in contact thereby enabling the cup-like members to move longitudinally relative to each other to increase the thickness of the washer.

* * * * *